US008870273B2

(12) United States Patent
Takeda et al.

(10) Patent No.: US 8,870,273 B2
(45) Date of Patent: Oct. 28, 2014

(54) ENGINE MOUNT SUPPORT STRUCTURE

(75) Inventors: Tomoya Takeda, Wako (JP); Shigetaka Kameyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/813,979

(22) PCT Filed: Jun. 21, 2011

(86) PCT No.: PCT/JP2011/064122
§ 371 (c)(1),
(2), (4) Date: Feb. 4, 2013

(87) PCT Pub. No.: WO2012/017747
PCT Pub. Date: Feb. 9, 2012

(65) Prior Publication Data
US 2013/0140852 A1    Jun. 6, 2013

(30) Foreign Application Priority Data

Aug. 5, 2010   (JP) ................ 2010-176604

(51) Int. Cl.
*B60K 5/12*    (2006.01)
*B62D 25/08*    (2006.01)

(52) U.S. Cl.
CPC ........... *B60K 5/12* (2013.01); *B62D 25/082* (2013.01)
USPC .................................. 296/203.02

(58) Field of Classification Search
CPC .................... B60K 5/12; B62D 25/08
USPC ........... 296/203.01–203.03, 193.03, 187.04, 296/187.09, 193.01
See application file for complete search history.

(56) References Cited

U.S. PATENT DOCUMENTS

| 6,588,832 B2 * | 7/2003 | Sakuma ................... 296/204 |
| 2002/0008408 A1 * | 1/2002 | Tilsner et al. ............. 296/194 |
| 2004/0189055 A1 * | 9/2004 | Tomita ................. 296/203.02 |
| 2004/0200659 A1 * | 10/2004 | Miyasaka ................ 180/312 |
| 2006/0175873 A1 * | 8/2006 | Miyata et al. .......... 296/203.02 |
| 2008/0238146 A1 * | 10/2008 | Nusier et al. .......... 296/193.09 |
| 2009/0230665 A1 * | 9/2009 | Tamura et al. ........... 280/785 |
| 2011/0095568 A1 * | 4/2011 | Terada et al. ......... 296/187.09 |

FOREIGN PATENT DOCUMENTS

| JP | 2003-002240 | 1/2003 |
| JP | 2003-322197 | 11/2003 |
| JP | 2004-299595 | 10/2004 |
| JP | 2005-112175 | 4/2005 |
| JP | 2006-213245 | 8/2006 |
| JP | 2006-219068 | 8/2006 |

* cited by examiner

*Primary Examiner* — Pinel Romain
(74) *Attorney, Agent, or Firm* — Rankin, Hill & Clark LLP

(57) ABSTRACT

An engine mount support structure provided in the front section of a vehicle body. A lower front support component and lower rear support component of the engine mount are installed to a frame-side front joining component and frame-side rear joining component, the frame-side front joining component and frame-side rear joining component being formed at the front and rear direction of the front side frame. An upper support component of the engine mount is supported by the upper member via a mounting bracket. The mounting bracket forms a V-shape and includes a front mounting component and rear mounting component respectively installed to a member-side front joining component and member-side rear joining component of the upper member; and an inner mounting component onto which the upper support component is installed.

8 Claims, 9 Drawing Sheets

ENGINE MOUNT SUPPORT STRUCTURE

TECHNICAL FIELD

The present invention relates to an engine mount supporting structure including a front side frame extending longitudinally of a vehicular body, an upper member extending rearward of the vehicular body and upward convexly curved, and an engine mount supporting an engine.

BACKGROUND ART

Patent document 1 below discloses an engine mount supporting structure including a side member (a front side frame) extending longitudinally of a vehicular body, a cowl panel disposed above the side member, a connecting plate interconnecting the side member and the cowl panel, and an engine mount joined to the side member and the cowl panel and mounted to an engine. The engine mount includes an engine mount body having three coupled portions, that is, an upper outer portion coupled to the connecting plate, a lower front portion coupled to the side member through a mount bracket, and a lower rear portion coupled to the side member through the mount bracket.

The connecting plate, which interconnects the side member and the cowl panel, prevents the side member from upward deforming during head-on collision of a vehicle.

As for the engine mount supporting structure disclosed in patent document 1, the engine mount is coupled to the connecting plate at one point or the upper outer portion and coupled to the side member at two points or the lower front portion and the lower rear portion. This means that the engine mount has its lower part having a required strength to support the engine mount. However, the engine mount has its upper part having an insufficient strength to support the engine mount. Because of the insufficient strength of the upper part of the engine mount, the engine mount cannot sufficiently reduce an engine vibration.

Patent document 2 below discloses an engine mount supporting structure including a closed-cross-sectional front side frame having a top wall carrying front and rear fasteners (collar nuts) for fixing an engine mount to the top wall of the front side frame. More specifically, these fasteners are secured to support plates taking the form of bulkheads partitioning an inner space of the front side frame.

The support plates act as the bulkheads to insure a high strength to support the engine mount.

As for the engine mount supporting structure disclosed in patent document 2, the engine mount is free at its upper portion while the engine mount has its lower portion fixed at two points to the front side frame. The free upper portion of the engine mount has an insufficient strength to support the engine mount. Because of the insufficient strength, the engine mount cannot sufficiently reduce an engine vibration.

PRIOR ART LITERATURE

Patent Document

Patent Document 1: JP-A-2006-213245
Patent Document 2: JP-A-2006-219068

SUMMARY OF INVENTION

Technical Problem

An object of the present invention is to provide an engine mount supporting structure having an improved strength to support an engine mount so as to reduce an engine vibration and achieve a quietness of a passenger compartment of a vehicle.

Solution to Problem

According to one aspect of the present invention, there is provided an engine mount supporting structure comprising: a front side frame extending longitudinally of a vehicular body; an upper member disposed laterally outwardly of the front side frame and extending rearwardly of the vehicular body, the upper member being upward convexly curved; an engine mount attached to the front side frame and disposed between the front side frame and the upper member; and an attachment bracket attached to the upper member, wherein the engine mount includes: an engine mount body; a top support supporting a top portion of the engine mount body and supported by the attachment bracket; a bottom front support supporting a bottom front portion of the engine mount body; and a bottom rear support supporting a bottom rear portion of the engine mount body, wherein the front side frame includes a front coupled portion and a rear coupled portion arranged longitudinally of the vehicular body, the front coupled portion being attached to the bottom front support of the engine mount, the rear coupled portion being attached to the bottom rear support of the engine mount, and wherein the attachment bracket has a V-shape including a front attached portion attached to a front coupled section of the upper member, a rear attached portion attached to a rear coupled section of the upper member, and an inner attached portion attached to the top support of the engine mount.

Preferably, the front coupled portion of the front side frame and the rear coupled section of the upper member are diagonally opposed to one another with a first diagonal line passing through the front coupled portion and the rear coupled section, wherein the rear coupled portion of the front side frame and the front coupled section of the upper member are diagonally opposed to one another with a second diagonal line passing through the rear coupled portion and the front coupled section, wherein each of the front side frame and the upper member includes first locations on the first diagonal line and the second diagonal line and second locations other than the first locations, the first locations being greater in strength than the second locations.

Preferably, the engine mount supporting structure further comprises a front bulkhead upper support adapted to support an upper portion of a front bulkhead disposed internally of a front end of the front side frame, wherein the front coupled section of the upper member is coupled to the front bulkhead upper support.

Preferably, the front coupled section of the upper member includes a partition wall coupled to a top wall of the front bulkhead upper support.

Preferably, the V-shaped attachment bracket has a flange extending along an outer circumference thereof for increasing a strength of the attachment bracket.

Preferably, the front coupled section of the upper member is disposed on an upper surface of a curved portion of the upper member, and the rear coupled section of the upper member is disposed inside the curved portion of the upper member.

Advantageous Effects of Invention

The attachment bracket has the V-shape including the front and rear attached portions attached to the front and rear coupled sections of the upper member, and the inner attached portion attached to the top support of the engine mount. This attachment bracket provides an increased strength to support the engine mount, thereby reducing an engine vibration. This achieves a quietness of a passenger compartment of a vehicle.

The first locations on the first and second diagonal lines are greater in strength than the second locations, such that the engine mount is supported with an increased strength laterally and longitudinally of the vehicular body.

The front coupled section of the upper member is coupled to the front bulkhead upper support, thereby increasing a strength to support an upper part of the engine mount.

The partition wall is coupled to the top wall of the front bulkhead upper support and oriented in directions of shearing of the partition wall so as to provide an increased strength laterally and longitudinally of the vehicular body.

The flange extends along the outer circumference of the V-shaped attachment bracket to increase the strength of the attachment bracket, such that the attachment bracket supports and reinforces the front and rear coupled sections of the upper member.

The front coupled section of the upper member is disposed on an upper surface of a curved portion of the upper member, and the rear coupled section of the upper member is disposed inside the curved portion of the upper member. This enables the inner attached portion of the attachment bracket to be disposed at or proximate an intersection of the first and second diagonal lines. As a result, vibration occurring laterally and longitudinally of the vehicular body can be efficiently dispersed along the respective diagonal lines.

DESCRIPTION OF EMBODIMENT

A certain preferred embodiment of the present invention is described below with reference to the accompanying drawings.

Embodiment

Figure 1:
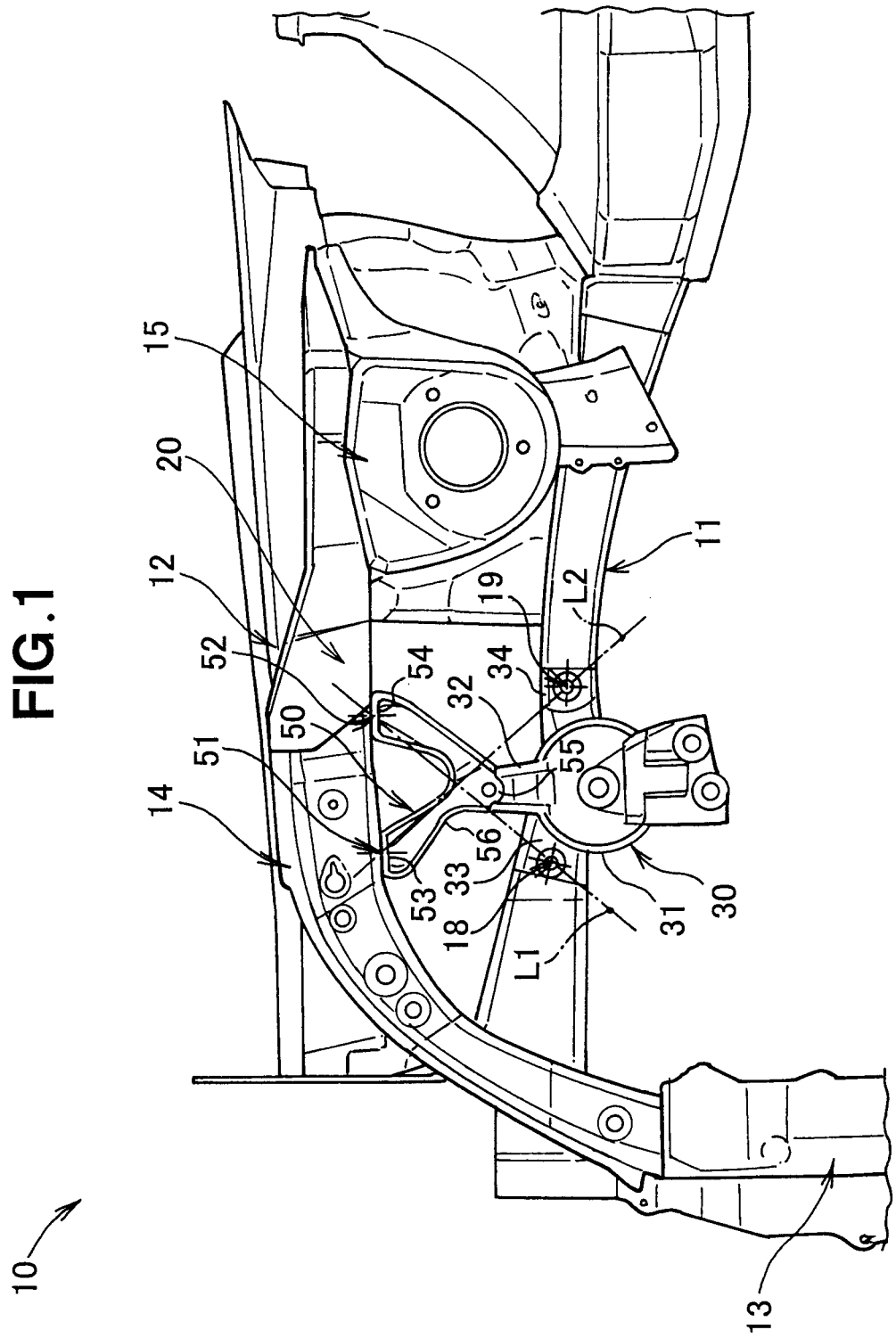
FIG. 1 is a plan view of an engine mount supporting structure in a preferred embodiment of the present invention, the structure being disposed at a front part of a vehicular body.
Figure 2:
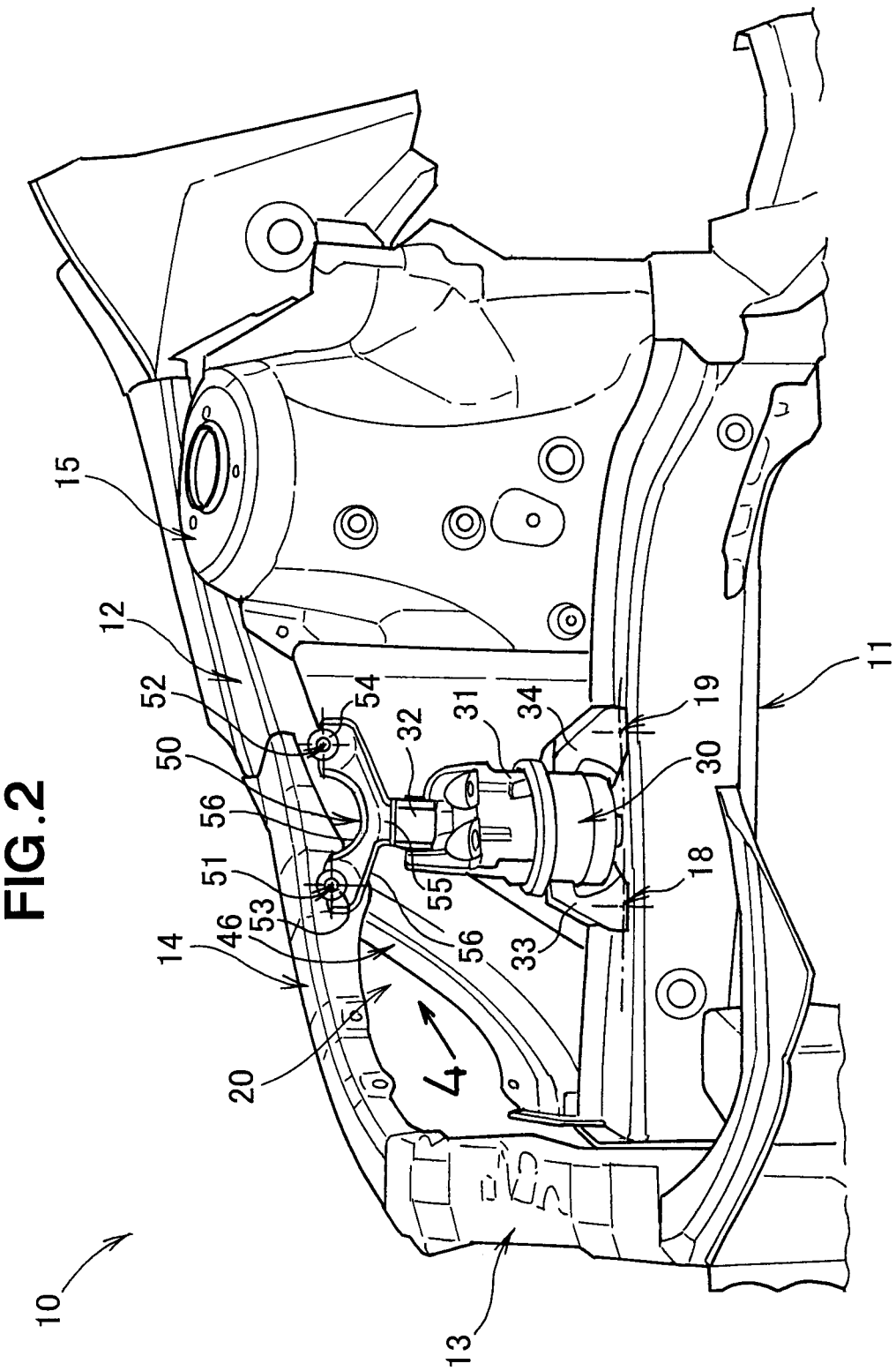
FIG. 2 is a perspective view of the engine mount supporting structure shown in FIG. 1.

Referring to FIG. 1 and FIG. 2, a vehicular body 10 includes an engine mount supporting structure 20 at a front part thereof. The engine mount supporting structure 20 includes a front side frame 11 extending longitudinally of the vehicular body 10 and an upper member 12 disposed outside the front side frame 11 in side-by-side relation to the front side frame 11. The upper member 12 is upward convexly curved and extends rearward of the vehicular body 10. The engine mount supporting structure 20 also includes an engine mount 30 attached to the front side frame 11 and disposed between the front side frame 11 and the upper member 12.

The vehicular body 10 further includes a front bulkhead 13 disposed internally of a front end of the front side frame 11. The upper member 12 carries a front bulkhead upper support 14 supporting an upper portion of the front bulkhead 13. A damper house 15 is disposed between the front side frame 11 and the upper member 12.

The engine mount supporting structure 20 shown in FIG. 1 is a structure constructed such that the engine mount 30 is supported by the front side frame 11 and the upper member 12, as will be detailed later.

Figure 8:
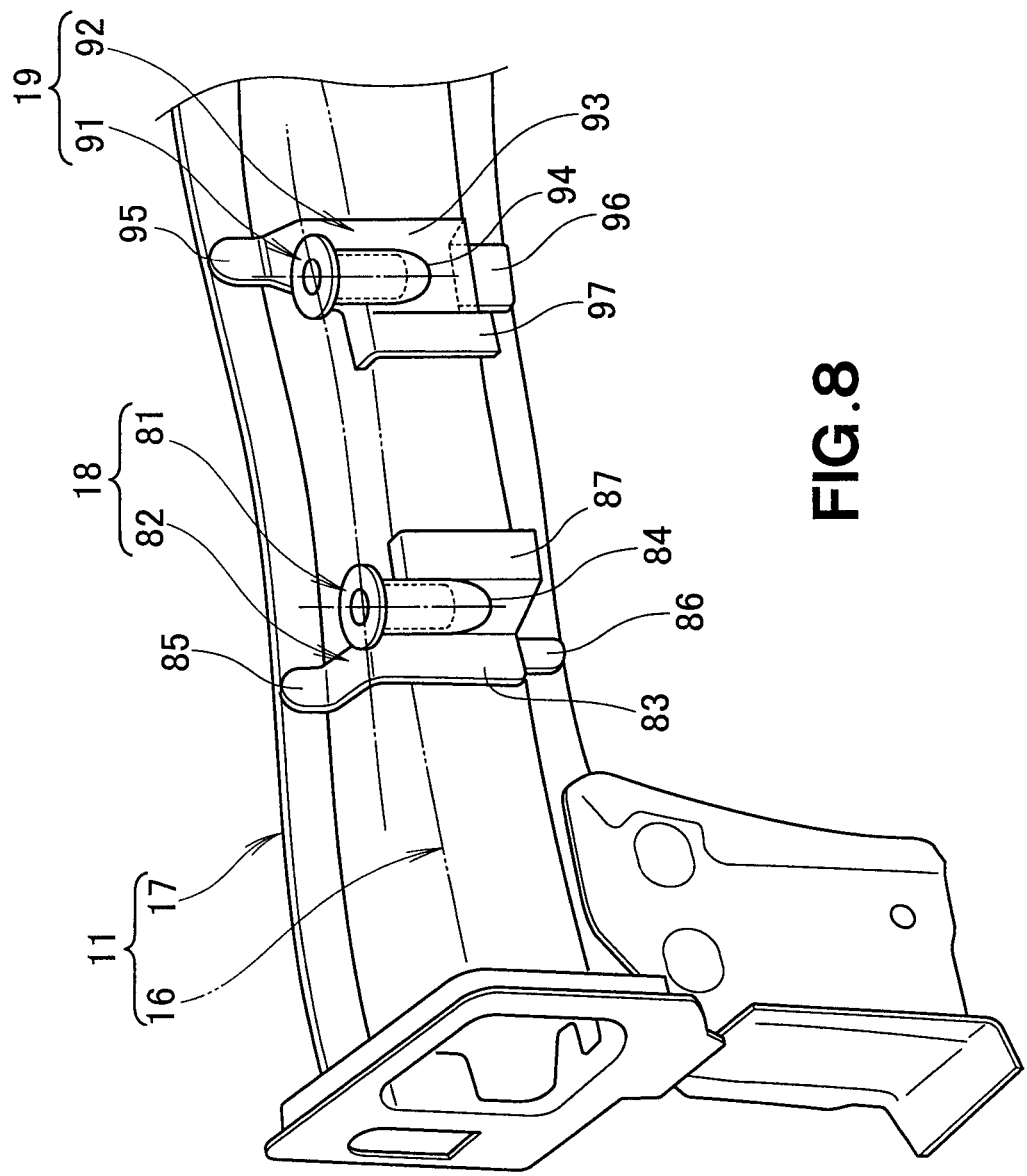
FIG. 8 is a perspective view of front and rear coupled portions of a front side frame shown in FIG. 1.

The front side frame 11 includes a frame body 16 of U-shaped cross-section and a frame lid (lid member) 17 closing a laterally directed opening of the frame body 16, as shown in FIG. 8. The frame body 16 and the frame lid 17 are both made from steel plates. The front side frame 11 includes a front coupled portion 18 and a rear coupled portion 19 which support the engine mount 30.

Figure 4:
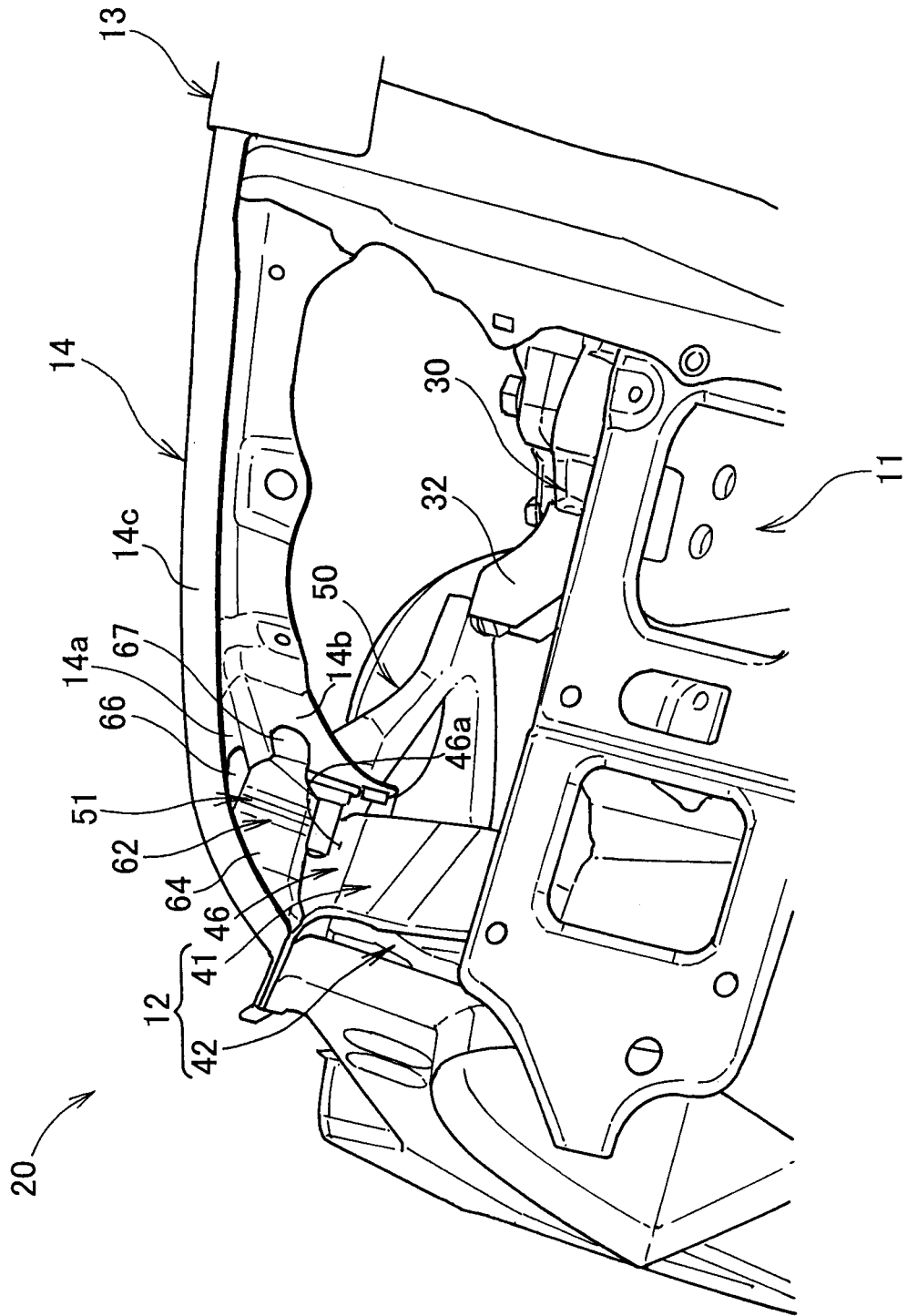
FIG. 4 is a view taken in a direction of an arrow 4 of FIG. 2.
Figure 5:
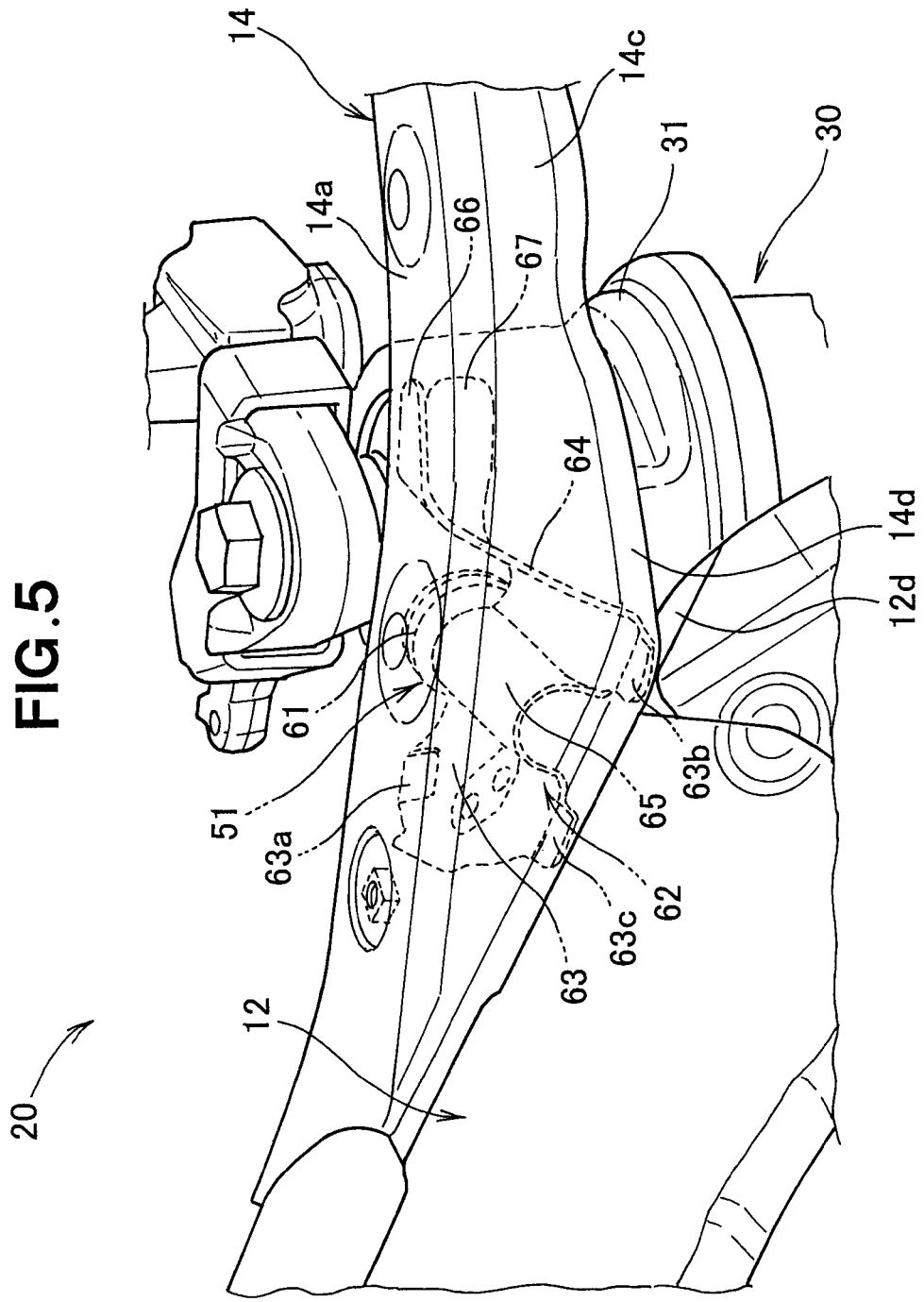
FIG. 5 is a perspective view of a front coupled section of an upper member of the engine mount supporting structure shown in FIG. 2.

The upper member 12 is disposed laterally outwardly of the front side frame 11 in side-by-side relation thereto. As shown in FIG. 4, the upper member 12 includes a body 41 of U-shaped cross-section and a lid 42 closing an opening of the body 41, thereby providing a closed cross-sectional structure of the upper member 12. The upper member 12 includes front and rear coupled sections 51, 52 to which is attached an attachment bracket 50 supporting the engine mount 30.

Figure 3:
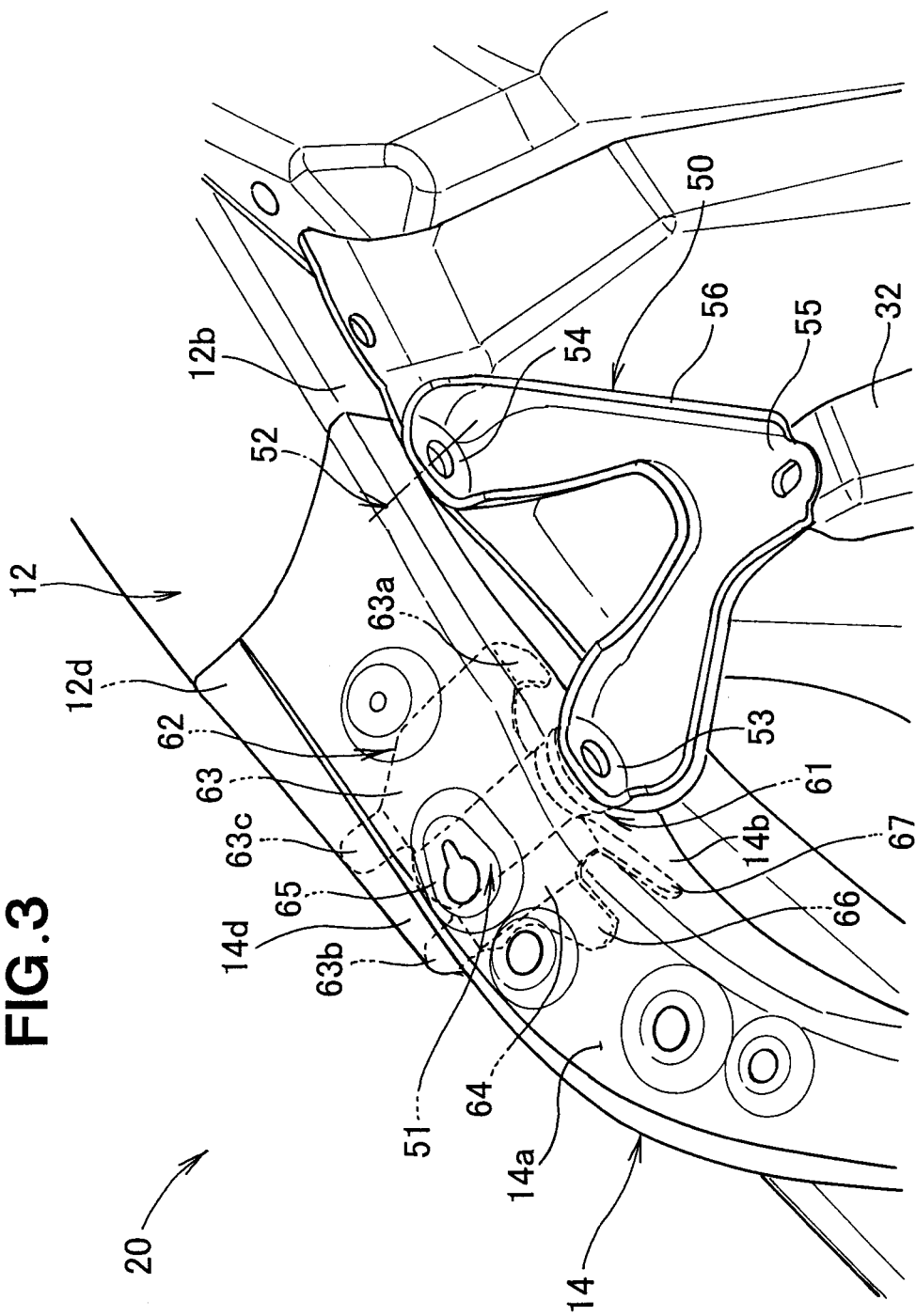
FIG. 3 is a perspective view of an attachment bracket shown in FIG. 2.

As shown in FIG. 3 and FIG. 4, the front bulkhead upper support 14 includes a top wall 14a, an inner wall 14b and an outer wall 14c which jointly define a U-shaped cross-sectional shape of the front bulkhead upper support 14. The front bulkhead upper support 14 interconnects the upper portion of the front bulkhead 13 and an intermediate portion of the upper member 12.

The engine mount 30 includes an engine mount body 31 (FIG. 2) and a top support 32 located at a top portion of the engine mount body 31 and supported by the upper member 12 through the attachment bracket 50. The engine mount 30 also includes a bottom front support 33 located at a bottom front portion of the engine mount body 31 and supported by the front coupled portion 18 of the front side frame 11, and a bottom rear support 34 located at a bottom rear portion of the engine mount body 31 and supported by the rear coupled portion 19 of the front side frame 11.

As shown in FIG. 1 to FIG. 3, the attachment bracket 50 is V-shaped, and includes a vertically-oriented front attached portion 53 and a vertically-oriented rear attached portion 54 which are attached to the front coupled section 51 of the upper member 12 and the rear coupled section 52 of the upper member 12, respectively. The attachment bracket 50 also includes a horizontally-oriented inner attached portion 55 attached to the top portion 32 of the engine mount 30. The attachment bracket 50 further includes a flange (a bend) 56 formed along a circumference of the attachment bracket 50 except that the inner attached portion 55 has a laterally inward-directed edge free from the flange 56. That is, the front attached portion 53 and the rear attached portion 54 each carry the flange 56.

The top support 32 of the engine mount 30 is supported by the upper member 12 through the front and rear attached portions 53 and 54 of the V-shaped attachment bracket 50. It is thus unlikely that the inner attached portion 55 to which is attached the top support 32 shifts longitudinally of the vehicular body 10. This means that the top support 32 of the engine mount 30 is supported with an increased strength longitudinally of the vehicular body 10.

Additionally, the inner attached portion 55 of the attachment bracket 50 does not shift laterally of the vehicular body 10. This means that the top support 32 of the engine mount 30 is supported with an increased strength laterally of the vehicular body 10. Therefore, it is possible for the engine mount 30 to absorb an engine vibration to reduce acoustic pressure level of a passenger compartment of a vehicle even if a great vibration of engine occurs just after the vehicle starts to run. As a result, the vehicle can provide a quietness just after starting to run. In addition, it can reduce a change in acoustic pressure upon acceleration of the vehicle.

As shown in FIG. 1, the front coupled portion 18 of the front side frame 11 and the rear coupled section 52 of the upper member 12 are diagonally opposed to one another with a first diagonal line L1 passing through the front coupled portion 18 and the rear coupled section 52. The rear coupled portion 19 of the front side frame 11 and the front coupled section 51 of the upper member 12 are diagonally opposed to one another with a second diagonal line L2 passing through the rear coupled portion 19 and the front coupled section 51.

The front side frame 11 and the upper member 12 include first locations on the first and second diagonal lines L1, L2 and second locations other than the first regions. The first regions are greater in strength than the second regions. That is, the front side frame 11 includes the front and rear coupled portions 18, 19 which support the engine mount 30 while the upper member 12 includes the front and rear coupled sections 51, 52 to which is attached the attachment bracket 50 supporting the engine mount 30.

As shown in FIG. 3 to FIG. 6, the front coupled section 51 of the upper member 12 carries a collar nut 61 into which is screwed a bolt (not shown) to fix the front attached portion 53 of the attachment bracket 50 to the front coupled section 51. The front coupled section 51 includes a partition wall (a bracket) 62 having a bracket portion 63 and a bulkhead portion 64. The bracket portion 63 and the bulkhead portion 64 cooperate with the front bulkhead upper support 14 to support the collar nut 61. The front coupled section 51 acts as a support having a bulkhead structure provided with a collar nut.

The collar nut 61 includes a tubular portion 61b having an inner thread formed thereon and a flange portion 61c abutting on the front bulkhead upper support 14.

The partition wall 62 includes a semi-tubular coupled portion 65 coupled to the tubular portion 61b of the collar nut 61. At the bracket portion 63 of the partition wall 62 is formed an inner rear flange 63a located between and coupled to an interior wall 12b of the upper member 12 and the inner wall 14b of the front bulkhead upper support 14. Formed at the bracket portion 63 are an outer front flange 63b and an outer rear flange 63c which are located between and coupled to an exterior flange 12d of the upper member 12 and an outer flange 14d of the front bulkhead upper support 14. The bulkhead portion 64 is bent from the bracket portion 63 and partitions an inner space of the front bulkhead upper support 14. Bent from the bulkhead portion 64 is an upper flange 66 coupled to the top wall 14a of the front bulkhead upper support 14. Bent from the bulkhead portion 64 is an inner front flange 67 coupled to the inner wall 14b of the front bulkhead upper support 14.

The bracket portion 63 of the front coupled section 51 and the collar nut 61 extend laterally of the vehicular body 10, i.e., in a direction of application of a force from the attachment bracket 50. That is, the bracket portion 63 is oriented in such a direction as to buckle under the force applied from the attachment bracket 50 to the bracket portion 63. The bulkhead portion 64 of the partition wall 62 is bent from the bracket portion 63 at a right angle to keep buckling of the bracket portion 63 to a minimum.

With the outer front flange 63b and the outer rear flange 63c coupled to both the exterior flange 12d of the upper member 12 and the outer flange 14d of the front bulkhead upper support 14, a force from the engine mount 30 can be dispersed into the upper member 12 and the front bulkhead upper support 14. This means that the engine mount 30 is supported with an increased strength. Since the outer front flange 63b and the outer rear flange 63c are coupled to both the exterior flange 12d and the outer flange 14d, the front bulkhead upper support 14 may deform by the least amount.

Figure 6:
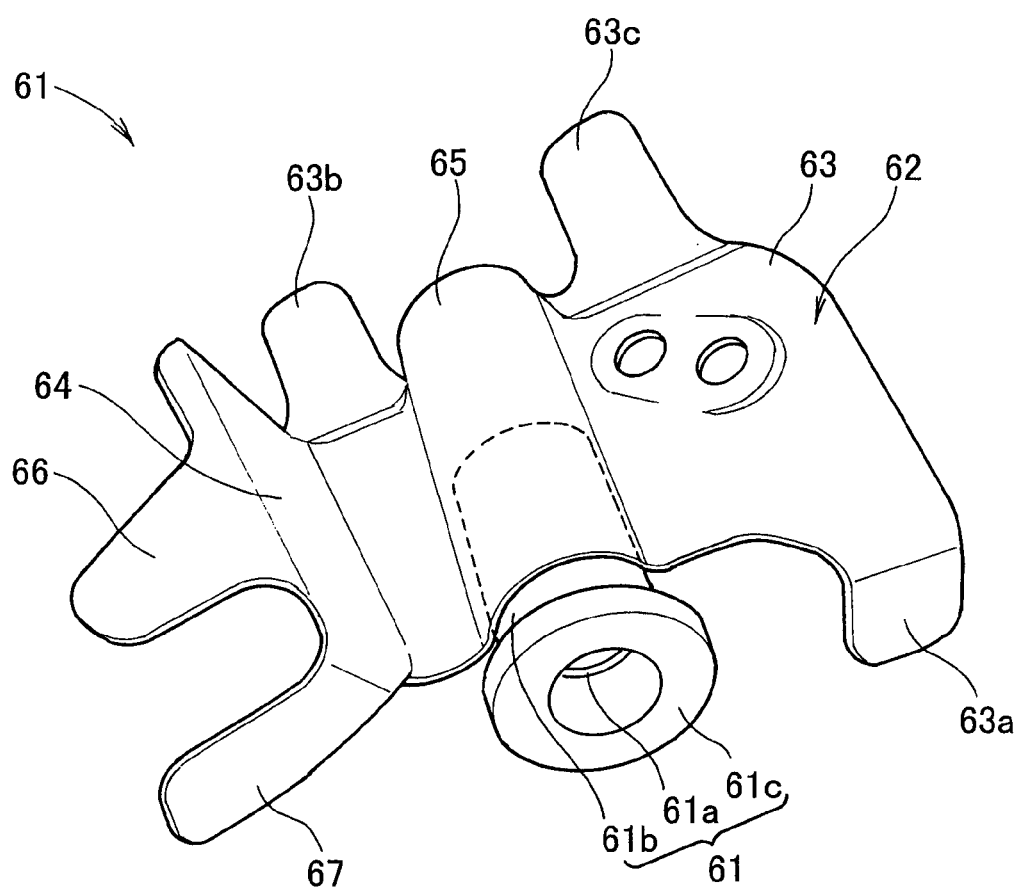
FIG. 6 is a perspective view of each of a collar nut and a partition wall shown in FIG. 5.
Figure 7:
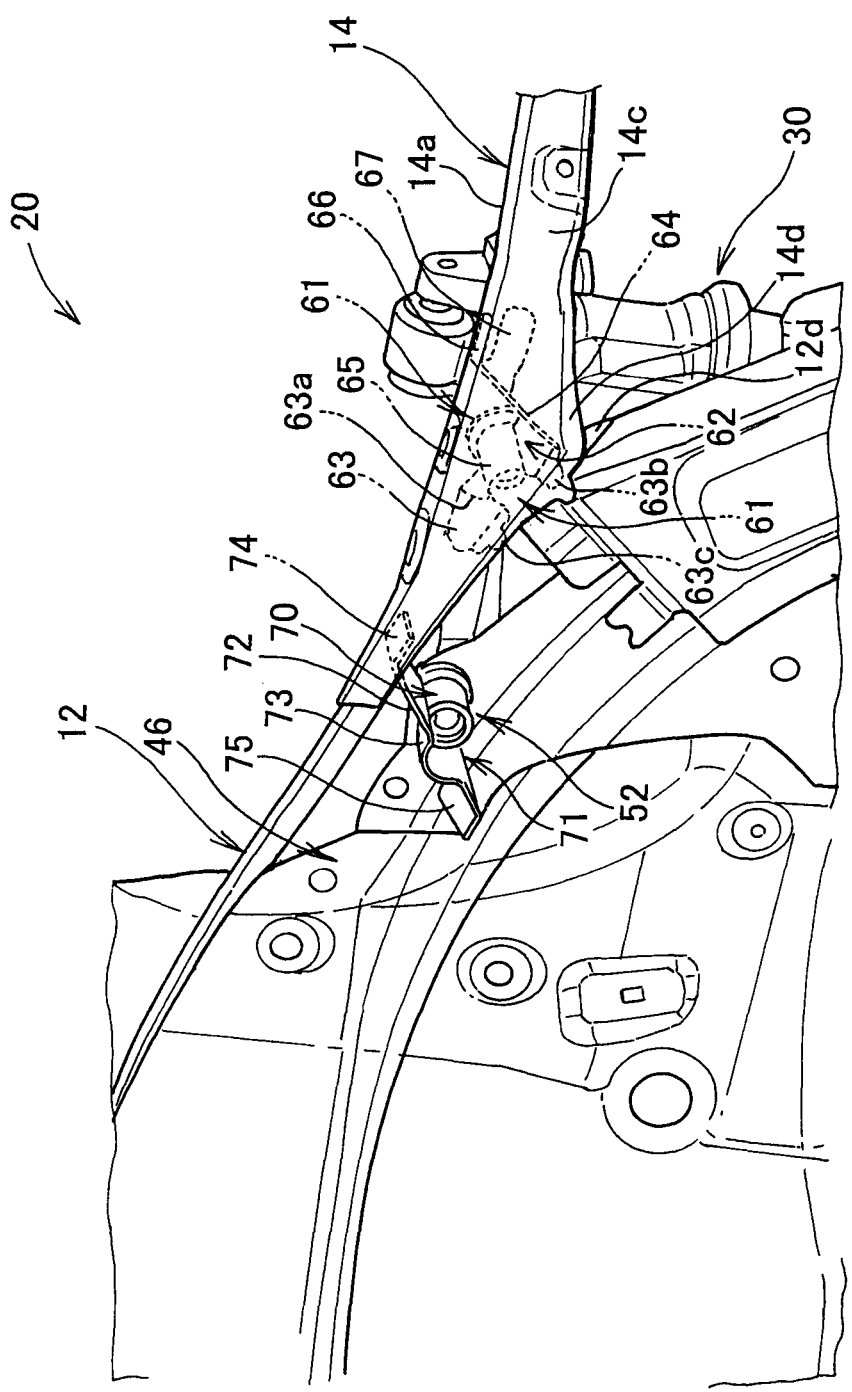
FIG. 7 is a perspective view of a rear coupled section of the upper member shown in FIG. 2.

As shown in FIG. 7, the rear coupled section 52 of the upper member 12 carries a collar nut 70 into which is screwed a bolt (not shown) to fix the rear attached portion 54 of the attachment bracket 50 to the rear coupled section 52. The rear coupled section 52 includes a bulkhead 71 by means of which the collar nut 70 is supported by the front bulkhead upper support 14. The rear coupled section 52 acts as a support having a bulkhead structure provided with a collar nut. The collar nut 70 is identical in structure to the collar nut 61 (FIG. 6).

The bulkhead 71 includes a bulkhead body 72 having a semi-tubular coupled portion 73 coupled to the collar nut 70. The bulkhead 71 also includes an upper flange 74 formed at the bulkhead body 72 and coupled to the front bulkhead upper support 14. The bulkhead 71 further includes a lower flange 75 formed at the bulkhead body 72.

As shown in FIG. 8, the front coupled portion 18 of the front side frame 11 carries a collar nut 81 into which is screwed a bolt (not shown) to fix the bottom front support 33 of the engine mount 30 to the front coupled portion 18. The front coupled portion 18 also carries a partition wall (front bracket) 82 by means of which the collar nut 81 is supported by the front side frame 11. The collar nut 81 is generally identical in structure to the collar nut 61 shown in FIG. 6.

The partition wall 82 includes a partition body (partitioning portion) 83 having a semi-tubular coupled portion 84 coupled to the collar nut 81. The partition wall 82 also includes an upper flange 85 extending from the partition body 83 and joined to both the frame body 16 and the frame lid 17. The partition wall 82 further includes a lower flange 86 extending from the partition body 83 and joined to both the frame body 16 and the frame lid 17. In addition, the partition wall 82 includes an inner flange 87 extending from the partition body 83 and joined to the frame body 16.

The rear coupled portion 19 of the front side frame 11 carries a collar nut 91 into which is screwed a bolt (not shown) to fix the bottom rear support 34 of the engine mount 30 to the rear coupled portion 19. The rear coupled portion 19 also carries a partition wall (rear bracket) 92 by means of which the collar nut 91 is supported by the front side frame 11. The collar nut 91 is generally identical in structure to the collar nut 61 shown in FIG. 6.

The partition wall 92 includes a partition body (partitioning portion) 93 having a semi-tubular coupled portion 94 coupled to the collar nut 91. The partition wall 92 also includes an upper flange 95 extending from the partition body 93 and joined to both the frame body 16 and the frame lid 17. The partition wall 92 further includes a lower flange 96 extending from the partition body 93 and joined to both the frame body 16 and the frame lid 17. In addition, the partition wall 92 includes an inner flange 97 extending from the partition body 93 and joined to the frame body 16.

Figure 9:
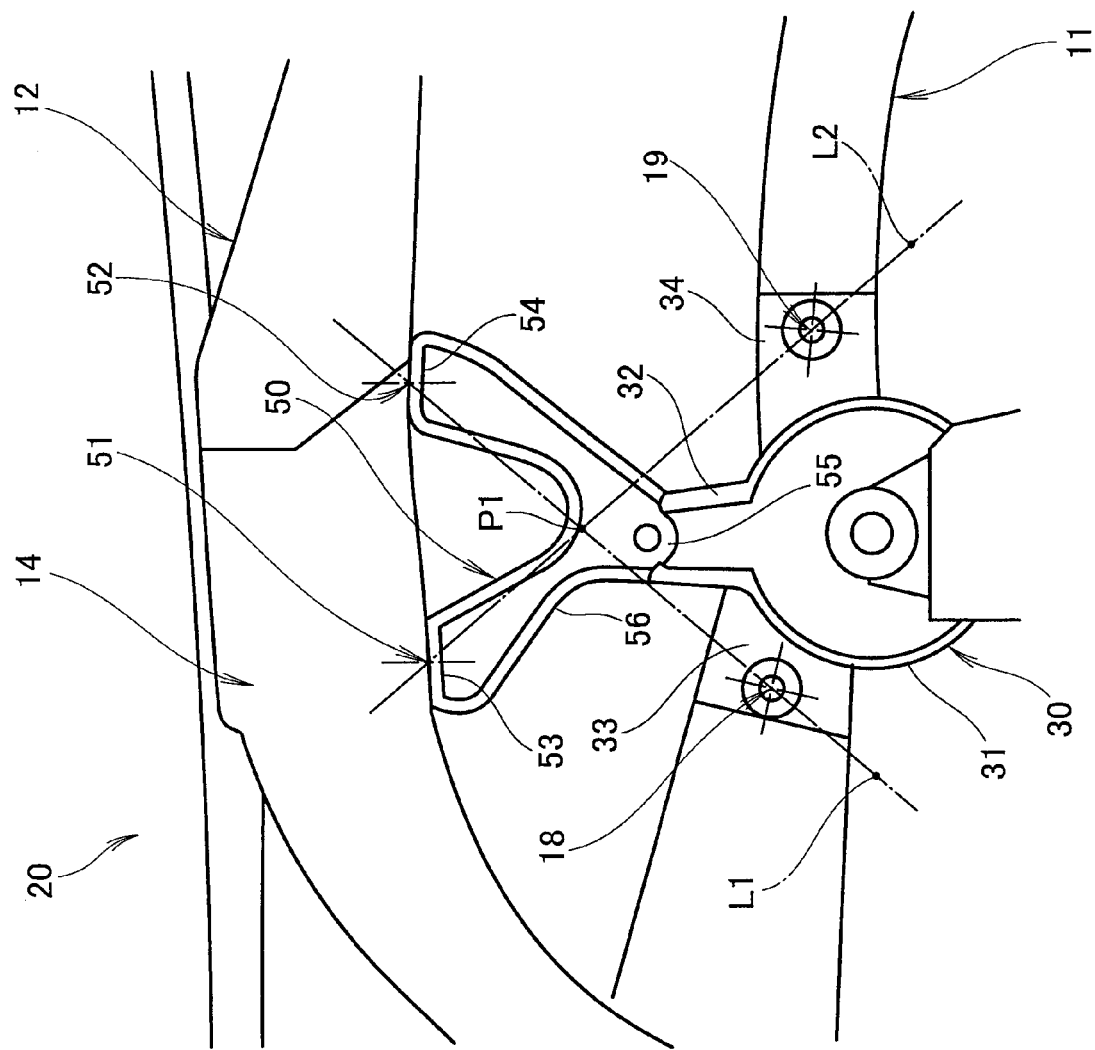
FIG. 9 is a schematic view of the engine mount supporting structure shown in FIG. 1.

The engine mount supporting structure shown in FIG. 9 includes the front side frame 11 extending longitudinally of the vehicular body 10, the upward convexly curved, upper member 12 disposed laterally outwardly of the front side frame 11 and extending rearwardly of the vehicular body 10, and the engine mount 30 supporting an engine (not shown). The engine mount 30 includes the engine mount body 31 supporting the engine, the top support 32 supporting a top portion of the engine mount body 31, the bottom front support 33 supporting a bottom front portion of the engine mount body 31, and the bottom rear support 34 supporting a bottom rear portion of the engine mount body 31.

The front side frame 11 includes the front coupled portion 18 and the rear coupled portion 19 arranged longitudinally of the vehicular body 10. The front coupled portion 18 is attached to the bottom front support 33 of the engine mount 30, and the rear coupled portion 19 is attached to the bottom rear support 34 of the engine mount 30. The top support 32 is supported by the upper member 12 through the attachment bracket 50.

The attachment bracket 50 has the V-shape including the front attached portion 53 attached to the front coupled section 51 of the upper member 12, the rear attached portion 54 attached to the rear coupled section 52 of the upper member 12, and the inner attached portion 55 attached to the top support 32 of the engine mount 30. This attachment bracket 50 provides an increased strength to support the engine mount 30, thereby reducing an engine vibration. This achieves a quietness of a passenger compartment of a vehicle.

As shown in FIG. 7 to FIG. 9, in the engine mount supporting structure 20, the front coupled portion 18 of the front side frame 11 and the rear coupled section 52 of the upper member 12 are diagonally opposed to one another with the first diagonal line L1 passing through the front coupled portion 18 and the rear coupled section 52. The rear coupled portion 19 of the front side frame 11 and the front coupled section 51 of the upper member 12 are diagonally opposed to one another with the second diagonal line L2 passing through the rear coupled portion 19 and the front coupled section 51. Each of the front side frame 11 and the upper member 12 includes the first locations on the first diagonal line L1 and the second diagonal line L2 and the second locations other than the first locations, and the first locations are greater in strength than the second locations. As a result, the engine mount is supported with an increased strength laterally and longitudinally of the vehicular body.

The first diagonal line L1 and the second diagonal line L2 intersect at a point P1 located at or proximate the inner attached portion 55 of the attachment bracket 50. As a result, vibration occurring laterally and longitudinally of the vehicular body can be efficiently dispersed along the respective diagonal lines L1, L2 to prevent the attachment bracket 50 from turning on the engine mount 30.

As shown in FIG. 3 and FIG. 4, the front bulkhead 13 is disposed internally of a front end of the front side frame 11. The front bulkhead upper support 14 supporting an upper portion of the front bulkhead 13 is disposed on the upper member 12. The front coupled section 51 of the upper member 12 is coupled to the front bulkhead upper support 14. This increases a strength to support an upper part of the engine mount 30.

The front coupled section 51 of the upper member 12 includes the partition wall 62 coupled to the top wall 14a of the front bulkhead upper support 14. The partition wall 62 coupled to the top wall 14a of the front bulkhead upper support 14 is oriented in directions of shearing of the partition wall so as to provide an increased strength laterally and longitudinally of the vehicular body 10.

As shown in FIG. 3, the V-shaped attachment bracket 50 has the flange 56 extending along an outer circumference thereof for increasing a strength of the attachment bracket 50. The thus arranged attachment bracket 50 supports and reinforces the front and rear coupled sections 51, 52 of the upper member 12.

As shown in FIG. 4, FIG. 7 and FIG. 9, the front coupled section 51 of the upper member 12 is disposed on an upper surface 46a of a curved portion 46 of the upper member 12, and the rear coupled section 52 of the upper member 12 is disposed inside the curved portion 46 of the upper member 12. This enables the inner attached portion of the attachment bracket to be disposed at or proximate the point P1 of intersection of the first and second diagonal lines L1, L2. As a result, vibration occurring laterally and longitudinally of the vehicular body 10 can be efficiently dispersed along the respective diagonal lines L1, L2.

The engine mount supporting structure in the embodiment of the present invention has been described as being designed such that the flange 56 for increasing strength and rigidity of the attachment bracket 50 extends along the circumference of the attachment bracket 50 except for the laterally inward-directed edge of the inner attached portion 55 of the attachment bracket 50. It may be altered such that the flange 56 is formed to extend along the entire circumference of the attachment bracket 50, including the laterally inward-directed edge of the inner attached portion 55.

INDUSTRIAL APPLICABILITY

The engine mount supporting structure according to the present invention is preferably employed in a vehicle such as a sedan or van.

REFERENCE SIGNS LIST 10 vehicular body
11 front side frame
12 upper member
13 front bulkhead
14 front bulkhead upper support
14a top wall
18 front coupled portion
19 rear coupled portion
30 engine mount
31 engine mount body
32 top support
33 bottom front support
34 bottom rear support
50 attachment bracket
51 front coupled section
52 rear coupled section
53 front attached portion
54 rear attached portion
55 inner attached portion
56 flange (bend)
62 partition wall
L1 first diagonal line
L2 second diagonal line

The invention claimed is:
1. An engine mount supporting structure comprising:
a front side frame extending longitudinally of a vehicular body;

an upper member disposed laterally outwardly of the front side frame and extending rearwardly of the vehicular body, the upper member being upward convexly curved;

an engine mount attached to the front side frame and disposed between the front side frame and the upper member; and an attachment bracket attached to the upper member, wherein the engine mount includes:
- an engine mount body;
- a top support supporting a top portion of the engine mount body and supported by the attachment bracket;
- a bottom front support supporting a bottom front portion of the engine mount body; and
- a bottom rear support supporting a bottom rear portion of the engine mount body, wherein the front side frame includes a front coupled portion and a rear coupled portion arranged longitudinally of the vehicular body, the front coupled portion being attached to the bottom front support of the engine mount, the rear coupled portion being attached to the bottom rear support of the engine mount, wherein the attachment bracket has a V-shape including a front attached portion attached to a front coupled section of the upper member, a rear attached portion attached to a rear coupled section of the upper member, and an inner attached portion attached to the top support of the engine mount, and wherein the front coupled portion of the front side frame and the rear coupled section of the upper member are diagonally opposed to one another with a first diagonal line passing through the front coupled portion and the rear coupled section, wherein the rear coupled portion of the front side frame and the front coupled section of the upper member are diagonally opposed to one another with a second diagonal line passing through the rear coupled portion and the front coupled section, wherein each of the front side frame and the upper member includes first locations on the first diagonal line and the second diagonal line and second locations other than the first locations, the first locations being greater in strength than the second locations.

2. The structure of claim 1, further comprising a front bulkhead upper support adapted to support an upper portion of a front bulkhead disposed internally of a front end of the front side frame,
wherein the front coupled section of the upper member is coupled to the front bulkhead upper support.

3. The structure of claim 2, wherein the front coupled section of the upper member includes a partition wall coupled to a top wall of the front bulkhead upper support.

4. The structure of claim 1, wherein the V-shaped attachment bracket has a flange extending along an outer circumference thereof for increasing a strength of the attachment bracket.

5. An engine mount supporting structure comprising:
a front side frame extending longitudinally of a vehicular body;
an upper member disposed laterally outwardly of the front side frame and extending rearwardly of the vehicular body, the upper member being upward convexly curved;
an engine mount attached to the front side frame and disposed between the front side frame and the upper member; and
an attachment bracket attached to the upper member,
wherein the engine mount includes:
- an engine mount body;
- a top support supporting a top portion of the engine mount body and supported by the attachment bracket;
- a bottom front support supporting a bottom front portion of the engine mount body; and
- a bottom rear support supporting a bottom rear portion of the engine mount body, wherein the front side frame includes a front coupled portion and a rear coupled portion arranged longitudinally of the vehicular body, the front coupled portion being attached to the bottom front support of the engine mount, the rear coupled portion being attached to the bottom rear support of the engine mount, wherein the attachment bracket has a V-shape including a front attached portion attached to a front coupled section of the upper member, a rear attached portion attached to a rear coupled section of the upper member, and an inner attached portion attached to the top support of the engine mount, and wherein the front coupled section of the upper member is disposed on an upper surface of a curved portion of the upper member, and the rear coupled section of the upper member is disposed inside the curved portion of the upper member.

6. The structure of claim 5, further comprising a front bulkhead upper support adapted to support an upper portion of a front bulkhead disposed internally of a front end of the front side frame,
wherein the front coupled section of the upper member is coupled to the front bulkhead upper support.

7. The structure of claim 6, wherein the front coupled section of the upper member includes a partition wall coupled to a top wall of the front bulkhead upper support.

8. The structure of claim 5, wherein the V-shaped attachment bracket has a flange extending along an outer circumference thereof for increasing a strength of the attachment bracket.

* * * * *